(12) United States Patent
Hu

(10) Patent No.: US 8,321,694 B2
(45) Date of Patent: Nov. 27, 2012

(54) POWER SUPPLY CIRCUIT FOR SOUTH BRIDGE CHIP

(75) Inventor: Ke-You Hu, Shenzhen (CN)

(73) Assignees: Hong Fu Jin Precision Industry (ShenZhen) Co., Ltd., Shenzhen, Guangdong Province (CH); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 491 days.

(21) Appl. No.: 12/758,609

(22) Filed: Apr. 12, 2010

(65) Prior Publication Data

US 2011/0140677 A1    Jun. 16, 2011

(51) Int. Cl.
*G06F 1/26* (2006.01)
(52) U.S. Cl. .......... 713/300; 713/310; 323/280
(58) Field of Classification Search .......... 713/300, 713/310; 323/280
See application file for complete search history.

(56) References Cited

U.S. PATENT DOCUMENTS

| 7,538,452 | B2 * | 5/2009 | Lin | 307/85 |
| 7,795,957 | B1 * | 9/2010 | Hu | 327/558 |
| 7,949,886 | B2 * | 5/2011 | Zou et al. | 713/300 |
| 8,013,644 | B2 * | 9/2011 | Hu | 327/141 |
| 8,205,104 | B2 * | 6/2012 | Hu | 713/300 |
| 2004/0002780 | A1 * | 1/2004 | Chang | 700/94 |
| 2005/0015635 | A1 * | 1/2005 | Juan | 713/323 |
| 2010/0250983 | A1 * | 9/2010 | Wang | 713/320 |

* cited by examiner

*Primary Examiner* — Chun Cao
(74) *Attorney, Agent, or Firm* — Altis Law Group, Inc.

(57) ABSTRACT

A power supply circuit for south bridge chip includes a voltage conversion chip, a control circuit, and a voltage increasing circuit coupled electrically to the voltage conversion chip and the control circuit. The voltage conversion chip is configured for outputting a driving signal. The control circuit is configured for receiving the driving signal and a first voltage, and converting the first voltage to a second voltage according to the driving signal. The voltage increasing circuit is configured for increasing voltage level of the second voltage, wherein the second voltage is supplied to the south bridge chip via the voltage increasing circuit.

8 Claims, 2 Drawing Sheets

POWER SUPPLY CIRCUIT FOR SOUTH BRIDGE CHIP

BACKGROUND

1. Technical Field

The present disclosure relates to power supply circuits, and particularly to a power supply circuit for south bridge chips of different types.

2. Description of Related Art

The south bridge chip, also known as an I/O Controller Hub (ICH) or a Platform Controller Hub (PCH) in INTEL systems, is a chip that implements the slower capabilities of the motherboard in a Northbridge/Southbridge chipset computer architecture. A power supply circuit provides power to the south bridge chip. The archetypal power supply circuit converts a 1.8 volts DC voltage to a 1.2 volts DC voltage, which is supplied to the south bridge chip via a control circuit. The control circuit is controlled by a voltage regulator. However, the power supply circuit only supplies power to certain types of south bridge chips. When the south bridge chip is changed, the power supply circuit cannot work properly.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
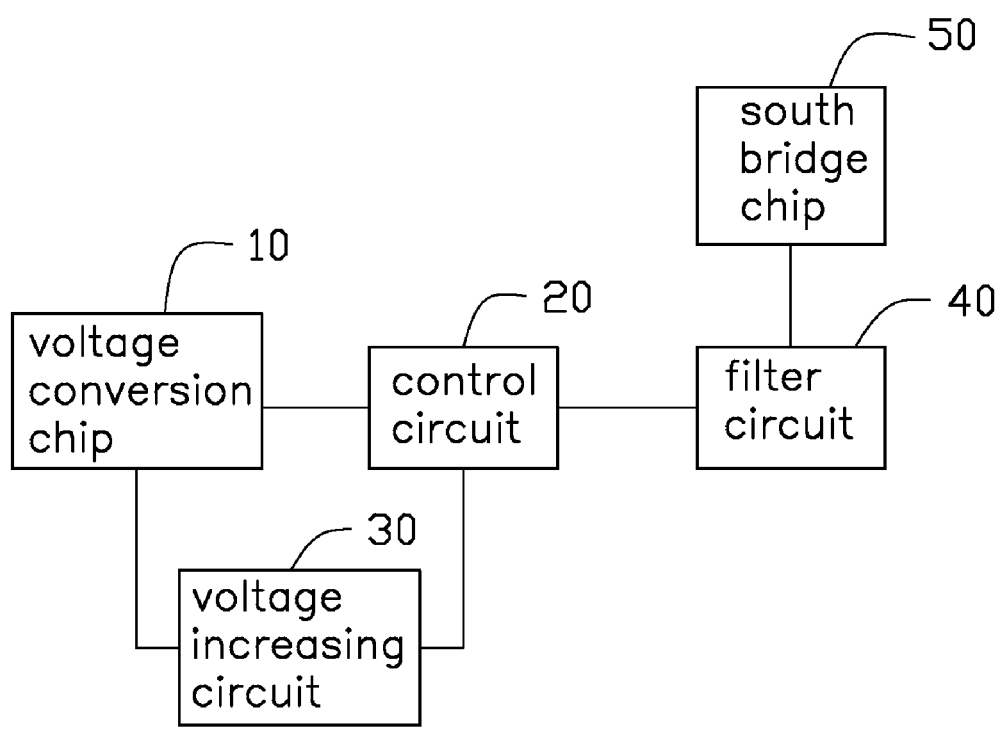
FIG. 1 is a block view of an embodiment of a power supply circuit for a south bridge chip.

Referring to FIG. 1, a power supply circuit in an embodiment for providing power to a south bridge chip 50, includes a voltage conversion chip 10, a control circuit 20, a voltage increasing circuit 30, and a filter circuit 40. The voltage conversion chip 10 is configured for ouputting a driving signal. The control circuit 20 is configured for receiving the driving signal and converting a first voltage to a second voltage via the voltage increasing circuit 30 according to the driving signal. The voltage increasing circuit 30 is coupled electrically to the voltage conversion chip 10 and the control circuit 20. The filter circuit 40 is coupled electrically to the control circuit 20 and the south bridge chip 50.

Figure 2:
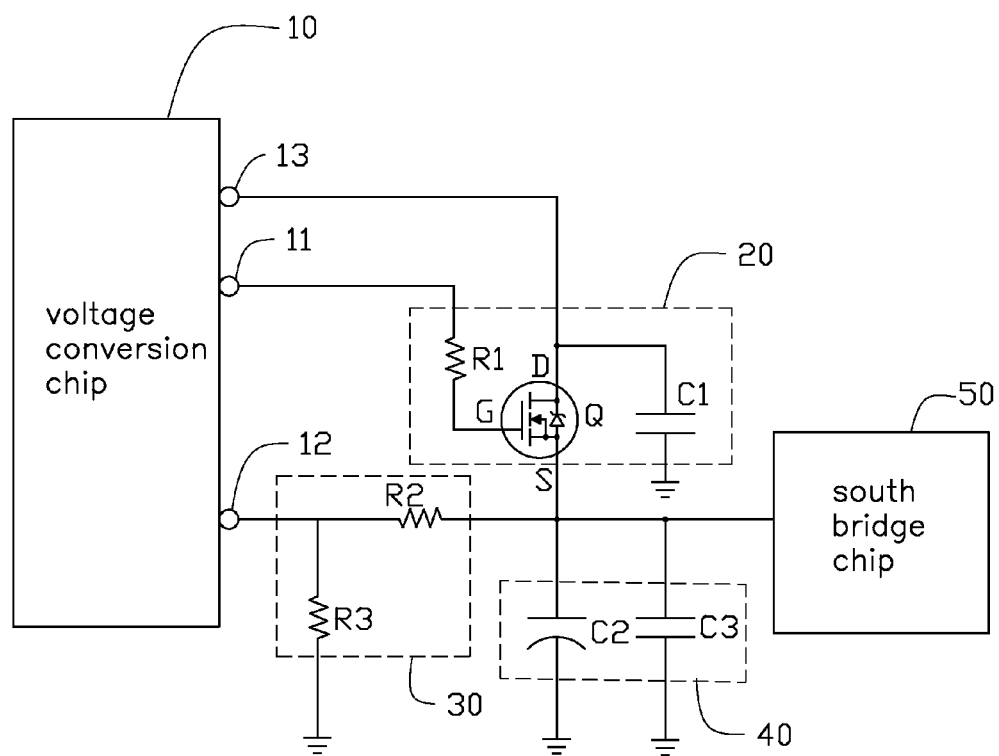
FIG. 2 is a circuit view of the power supply circuit of FIG. 1.

Referring to FIG. 2, the voltage conversion chip 10 includes a signal driving output terminal 11 for outputting the driving signal, a signal induction output terminal 12 for outputting an induction signal, and a first voltage output terminal 13 for outputting the first voltage. The control circuit 20 includes a transistor Q, a resistor R1, and a capacitor C1. A transistor Q gate is coupled electrically to the signal driving output terminal 11 via the resistor R1. A transistor Q drain is coupled electrically to the first voltage output terminal 13 and is grounded via the capacitor C1. A transistor Q source is coupled electrically to the south bridge chip 50. In this embodiment, the transistor Q is s an N-channel MOSFET, the first voltage is 1.8 volts.

The voltage increasing circuit 30 includes resistors R2, R3. A resistor R2 first terminal is coupled electrically to the transistor Q source. A resistor R2 second terminal is coupled electrically to a resistor R3 first terminal and is coupled electrically to the signal induction output terminal 12. A resistor R3 second terminal is grounded. The filter circuit 40 includes capacitors C2, C3. The transistor Q source is grounded via the capacitors C2, C3 respectively. In one embodiment, a resistance of the resistor R2 is 120 ohm. A resistance of the resistor R3 is 200 ohm.

In operation, the transistor Q gate receives a high level control signal from the signal driving output terminal 11 and turns on the transistor Q. The control circuit 20 converts the 1.8 volts first voltage to the second voltage, which is supplied to the south bridge chip 50. The south bridge chip 50 outputs a feedback signal to the signal induction output terminal 12 when receiving the second voltage. A voltage level of the transistor Q source is increased by the voltage increasing circuit 30. Therefore, the second voltage supplied to the south bridge chip 50 is also increased by the voltage increasing circuit 30.

A voltmeter was used to test voltage signals at the south bridge chip 50 input terminal of an embodiment. The test result shows that the second voltage maximum value is 1.23 volts when using the present power supply circuit, and is 1.147 volts when using a common power supply circuit. Therefore, the power supply circuit is capable of providing power to south bridge chips of different type.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit for south bridge chip, comprising:
   a voltage conversion chip capable of outputting a driving signal;
   a control circuit capable of receiving the driving signal and a first voltage and converting the first voltage to a second voltage according to the driving signal; and
   a voltage increasing circuit coupled electrically to the voltage conversion chip and the control circuit, wherein the second voltage is supplied to the south bridge chip via the voltage increasing circuit; and the voltage increasing circuit is capable of increasing voltage level of the second voltage.

2. The power supply circuit of claim 1, wherein voltage conversion chip comprises a signal driving output terminal, for outputting the driving signal; a signal induction output terminal, for outputting an induction signal; and a first voltage output terminal, for outputting the first voltage.

3. The power supply circuit of claim 2, wherein the control circuit comprises a transistor, a first resistor, and a first capacitor; a transistor gate is coupled electrically to the signal driving output terminal via the first resistor; a transistor drain is coupled electrically to the first voltage output terminal and is grounded via the first capacitor; a transistor source is coupled electrically to the south bridge chip.

4. The power supply circuit of claim 3, wherein the transistor is N-channel MOSFET.

5. The power supply circuit of claim 2, wherein a transistor gate is capable of receiving a high level output signal from the voltage conversion chip; the control circuit is capable of converting the first voltage to the second voltage, which is output at a transistor source.

6. The power supply circuit of claim 2, wherein the south bridge chip is capable of outputting a feedback signal to the signal induction output terminal when the second voltage is received.

7. The power supply circuit of claim 1, wherein the voltage increasing circuit comprises a second resistor and a third resistor; a second resistor first terminal is coupled electrically to a transistor source; a second resistor second terminal is coupled electrically to a third resistor first terminal and to a signal induction output terminal; and a third resistor second terminal is grounded.

8. The power supply circuit of claim 1, further comprising a filter circuit coupled electrically to the control circuit and the south bridge chip; the filter circuit comprises a second capacitor and a third capacitor; and a transistor source is grounded via the second and third capacitors respectively.

* * * * *

UNITED STATES PATENT AND TRADEMARK OFFICE
CERTIFICATE OF CORRECTION

PATENT NO. : 8,321,694 B2
APPLICATION NO. : 12/758609
DATED : November 27, 2012
INVENTOR(S) : Ke-You Hu It is certified that error appears in the above-identified patent and that said Letters Patent is hereby corrected as shown below:

Title Page, below Item (22) insert

-- (30)     Foreign Application Priority Data

Dec. 16, 2009   (CN) ...............................200920317640.X --

Signed and Sealed this
Twenty-second Day of October, 2013

Teresa Stanek Rea
*Deputy Director of the United States Patent and Trademark Office*